United States Patent
Uchida et al.

(10) Patent No.: US 12,351,252 B2
(45) Date of Patent: Jul. 8, 2025

(54) STEERING CONTROL DEVICE

(71) Applicants: DENSO CORPORATION, Kariya (JP); TOYOTA JIDOSHA KABUSHIKI KAISHA, Toyota (JP); JTEKT CORPORATION, Kariya (JP)

(72) Inventors: Takayuki Uchida, Kariya (JP); Yosuke Yamashita, Nagoya (JP); Shintaro Takayama, Toyota (JP); Kazuaki Iida, Toyota (JP); Masaharu Yamashita, Toyota (JP); Kazuma Hasegawa, Anjo (JP); Yuji Fujita, Okazaki (JP); Kenichi Abe, Okazaki (JP); Yuuta Kajisawa, Okazaki (JP); Yugo Nagashima, Anjo (JP)

(73) Assignees: DENSO CORPORATION, Aichi-pref. (JP); TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 300 days.

(21) Appl. No.: 18/183,761

(22) Filed: Mar. 14, 2023

(65) Prior Publication Data
US 2023/0219617 A1 Jul. 13, 2023

Related U.S. Application Data

(63) Continuation of application No. PCT/JP2021/032678, filed on Sep. 6, 2021.

(30) Foreign Application Priority Data

Sep. 17, 2020 (JP) ................. 2020-156606

(51) Int. Cl.
B62D 5/04 (2006.01)
B60R 25/0215 (2013.01)

(52) U.S. Cl.
CPC ........ *B62D 5/0469* (2013.01); *B60R 25/0215* (2013.01); *B62D 5/0463* (2013.01)

(58) Field of Classification Search
CPC .. B62D 5/0469; B62D 5/0463; B60R 25/002; B60R 25/02; B60R 25/021; B60R 25/02105; B60R 25/0215
See application file for complete search history.

(56) References Cited

U.S. PATENT DOCUMENTS

2019/0367084 A1* 12/2019 Hong ................ B62D 6/008

FOREIGN PATENT DOCUMENTS

EP 3 192 709 A1 7/2017
JP H7-277142 A 10/1995
(Continued)

*Primary Examiner* — Jacob M Amick
(74) *Attorney, Agent, or Firm* — Maschoff Brennan

(57) ABSTRACT

A steering control device is applied to a steer-by-wire system in which a steering mechanism and a turning mechanism are mechanically separated. The steering control device applied to the steer-by-wire system controls a drive of a steering motor that functions as a reaction motor that applies reaction torque to a steering wheel. A steering wheel lock calculating unit of the steering control device performs a steering wheel lock drive control for calculating a drive command so as to output a lock torque for maintaining a rotation stop state of the steering wheel by energizing the steering motor when a predetermined condition is satisfied while a vehicle is parked or stopped. A power converter converts power supply electric power according to the drive command calculated by the steering wheel lock calculating unit and supplies the electric power to the steering motor.

15 Claims, 11 Drawing Sheets

(56) References Cited

FOREIGN PATENT DOCUMENTS

| | | | |
|---|---|---|---|
| JP | 2003-312519 | A | 11/2003 |
| JP | 2004-175184 | A | 6/2004 |
| JP | 2006-182057 | A | 7/2006 |

* cited by examiner

REACTION FORCE DEVICE

TURNING DEVICE

FIRST EMBODIMENT

SECOND EMBODIMENT

THIRD EMBODIMENT

FOURTH EMBODIMENT

FIG. 10

| CURRENT ENERGIZED IN EACH PHASE | TIME | | | | | |
|---|---|---|---|---|---|---|
| | 1 | 2 | 3 | 4 | 5 | 6 |
| Iu | + | + | 0 | − | − | 0 |
| Iv | 0 | − | − | 0 | + | + |
| Iw | − | 0 | + | + | 0 | − |

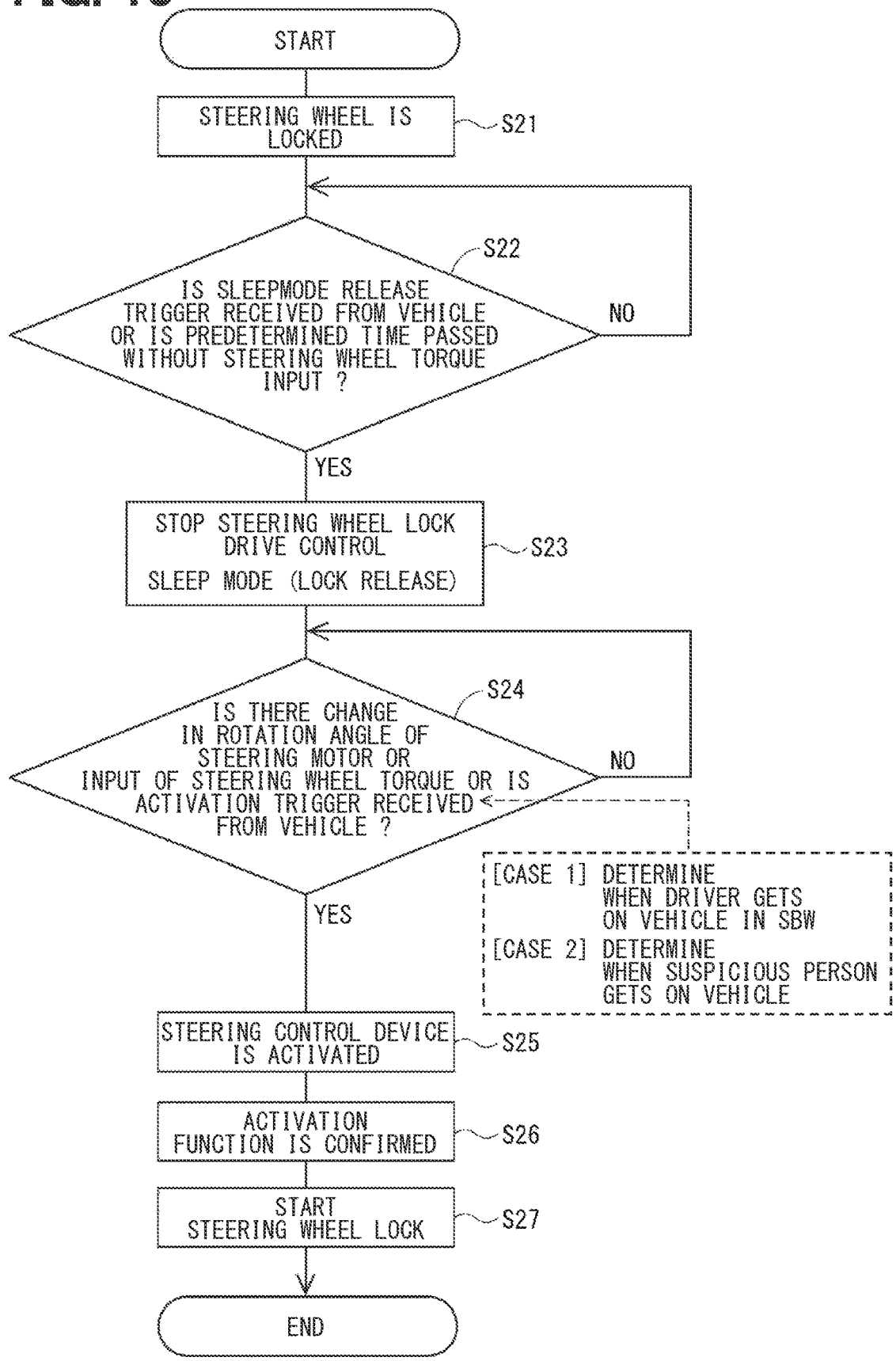

STEERING CONTROL DEVICE

CROSS REFERENCE TO RELATED APPLICATIONS

The present application is a continuation application of International Patent Application No. PCT/JP2021/032678 filed on Sep. 6, 2021, which designated the U.S. and claims the benefit of priority from Japanese Patent Application No. 2020-156606 in Japan filed on Sep. 17, 2020, the entire disclosure of the above application is incorporated herein by reference.

TECHNICAL FIELD

The present disclosure relates to a steering control device.

BACKGROUND

Conventionally, there has been known a device for locking a rotation of a steering wheel while a vehicle is parked or stopped in order to prevent the vehicle from being stolen or to prevent the steering wheel from rotating when the steering wheel is accidentally touched.

SUMMARY

A steering control device that realizes an electric steering wheel lock function is provided.

A steering control device of the present disclosure is applied to a steer-by-wire system in which a steering mechanism and a turning mechanism are mechanically separated, or an electric power steering system in which the steering mechanism and the turning mechanism are mechanically coupled.

The steering control device controls a drive of a reaction motor that applies reaction torque to a steering wheel in the steer-by-wire system, or the steering control device controls a drive of a steering motor that functions as a steering assist motor that applies steering assist torque to a steering wheel in an electric power steering system.

The steering control device includes a steering wheel lock calculating unit and a power converter. A steering wheel lock calculating unit performs a steering wheel lock drive control for calculating a drive command so as to output a lock torque for maintaining a rotation stop state of the steering wheel by energizing the steering motor when a predetermined condition is satisfied while a vehicle is parked or stopped. The power converter converts power supply electric power according to the drive command calculated by the steering wheel lock calculating unit and supplies the electric power to the steering motor.

BRIEF DESCRIPTION OF DRAWINGS

The above and other objects, features and advantages of the present disclosure will become more apparent from the following detailed description made with reference to the accompanying drawings.

In the drawings:

FIG. 10 is a transition table for explaining energized phase switching during controlling the wheel lock drive;

FIG. 13 is a flowchart showing a third example of activation/release processing of steering wheel lock drive control.

DETAILED DESCRIPTION

Figure 1:
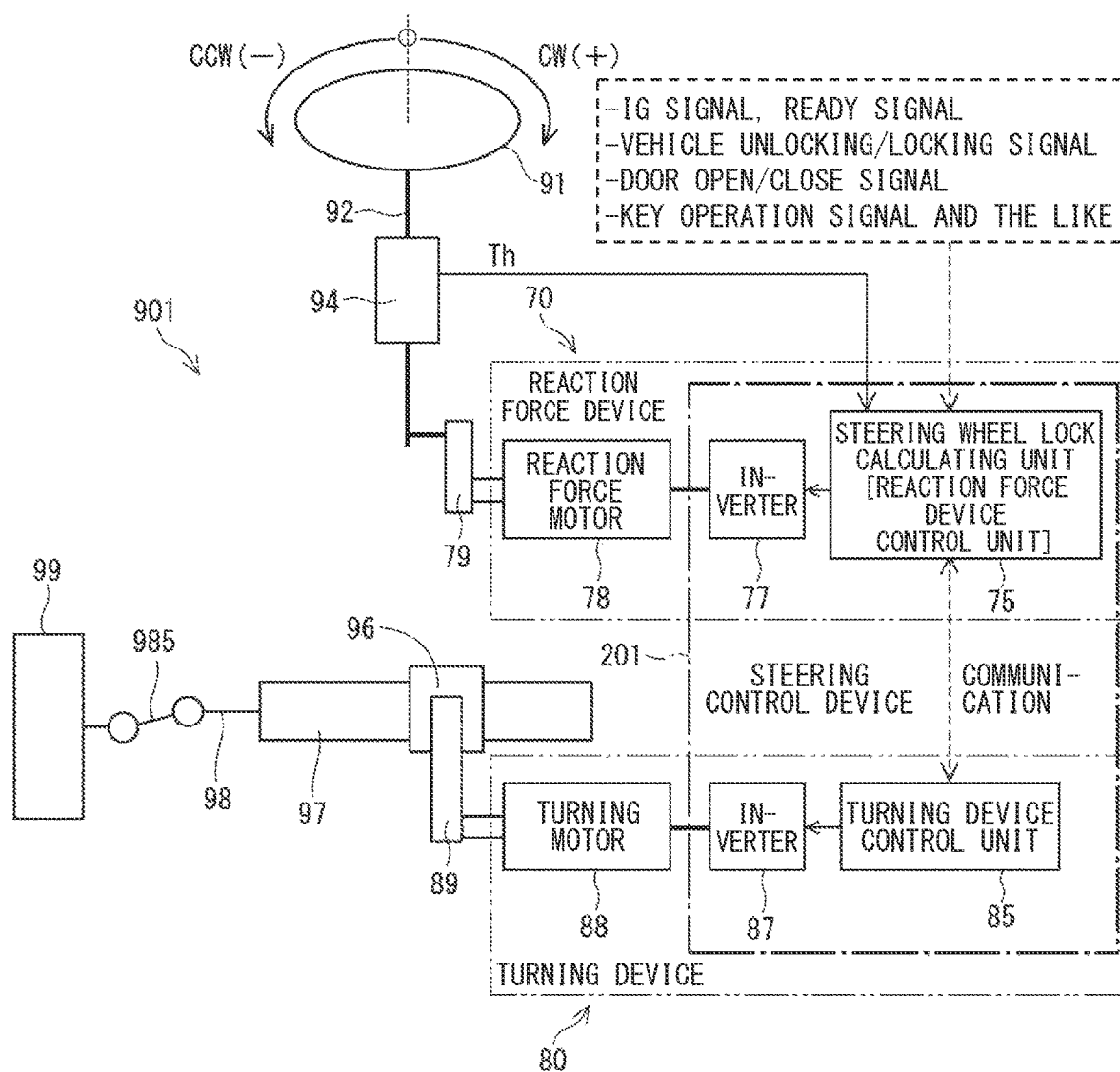
FIG. 1 is a diagram showing an overall configuration of a steer-by-wire system to which a steering control device according to a present embodiment is applied.

In an assumable example, there has been known a device for locking a rotation of a steering wheel while a vehicle is parked or stopped in order to prevent the vehicle from being stolen or to prevent the steering wheel from rotating when the steering wheel is accidentally touched. For example, in a steering lock device, when a motor rotates in one direction, a lock bar moves in a locking direction and engages with a locking hole of a steering shaft to lock the steering shaft. Further, when the motor rotates in the other direction, the lock bar moves in the unlocking direction to lock the steering shaft.

A conventional steering wheel lock device has a mechanical configuration in which a lock pin is operated in conjunction with an ignition key. Further, in recent years, the use of smart keys and the like has progressed, and the vehicles using an engine start button has a steering wheel lock mechanism, an actuator for moving a lock pin, and an electronic device for operating the actuator. The use of such a large number of devices complicates the system configuration, requires a larger installation space, and increases costs.

In particular, regarding the space around the steering wheel, around and behind the steering wheel, a dashboard cannot be increased in size because it obstructs visibility, and restrictions for installation are severe. In addition to the installation of structures for collision safety in this space, the installation space for new human interfaces such as head-up displays is increasing, making the installation space even tighter. In addition, a vehicle with a steer-by-wire system may require a space behind the steering wheel for a reaction force device that applies reaction force torque. Therefore, in order to effectively secure the space around the steering wheel, it is required to eliminate a mechanical handle lock device.

A steering control device that realizes an electric steering wheel lock function is provided.

A steering control device of the present disclosure is applied to a steer-by-wire system in which a steering mechanism and a turning mechanism are mechanically separated, or an electric power steering system in which the steering mechanism and the turning mechanism are mechanically coupled.

The steering control device controls a drive of a reaction motor that applies reaction torque to a steering wheel in the steer-by-wire system, or the steering control device controls a drive of a steering motor that functions as a steering assist motor that applies steering assist torque to a steering wheel in an electric power steering system.

The steering control device includes a steering wheel lock calculating unit and a power converter. A steering wheel lock calculating unit performs a steering wheel lock drive control for calculating a drive command so as to output a lock torque for maintaining a rotation stop state of the steering wheel by energizing the steering motor when a predetermined condition is satisfied while a vehicle is parked or stopped. The power converter converts power supply electric power according to the drive command calculated by the steering wheel lock calculating unit and supplies the electric power to the steering motor.

In the present disclosure, a steering wheel lock function is electrically realized by the steering wheel lock calculating unit calculating a drive command so that the steering motor outputs a lock torque. By adopting the above configurations, since a steering wheel lock mechanism, an actuator, an electronic device, a harness, etc. are not required, it can contribute to system simplification, securing space around the steering wheel, and cost reduction compared to mechanical steering wheel lock device.

A plurality of embodiments of the steering control device of the present disclosure will be described below based on the drawings. A steering control device of the present embodiment is applied to a vehicle steer-by-wire system (hereinafter referred to as "SBW system") or an electric power steering system (hereinafter referred to as "EPS system"), and is a device that electrically locks a rotation of a steering wheel while a vehicle is parked or stopped. Vehicle is not limited to four-wheeled vehicles, and includes motorcycles and buggies. In this specification, a motor that functions as a reaction force motor in the SBW system and a motor that functions as a steering assist motor in the EPS system are collectively referred to as "steering motor". The steering control device of both systems generally control a drive of the steering motor.

[Configuration of SBW System and EPS System]

First, the configurations of the SBW system and the EPS system will be described with reference to FIGS. 1 to 3. In the following description, the term "during normal operation" refers to a period when the vehicle is being driven by the driver and when the vehicle is starting and stopping, that is, a period other than when the vehicle is parked or stopped when the steering wheel is locked. During normal operation, the functions of the control unit for the reaction force device in the SBW system and the EPS control unit in the EPS system are different. However, since the control unit for the reaction force device and the EPS control unit have similar functions during parking or stopping focused on in the present embodiment, in this specification, for the sake of convenience, the control unit for the reaction force device and the EPS control unit are denoted by the same reference numeral "75" and collectively explained.

FIG. 1 shows the overall configuration of the SBW system 901 in which a steering mechanism and a turning mechanism are mechanically separated. In FIG. 1, wheel 99 shows only one side, and the wheel on the other side is not shown. The SBW system 901 has a reaction force device 70 and a turning device 80.

The reaction force device 70 includes a reaction force device control unit 75, an inverter 77 as a "power converter", and a reaction force motor 78 as a "steering motor", and is connected to a steering wheel 91 via a reaction force speed reducer 79 and a steering shaft 92. During the normal operation, the reaction force device control unit 75 calculates a drive command for the reaction force motor 78 so as to apply a reaction force torque to the steering wheel 91 with respect to steering by the driver.

The inverter 77 converts power supply electric power according to the drive command calculated by the reaction force device control unit 75 and supplies it to the reaction force motor 78. In the present embodiment, a three-phase brushless motor is used as the reaction force motor 78. The inverter 77 converts the DC power of the battery into three-phase AC power and supplies the converted electric power to the reaction force motor 78. As an example, the reaction force device control unit 75 and the inverter 77 may be configured integrally with the reaction force motor 78 as a so-called "electromechanically integrated motor".

The turning device 80 includes a turning device control unit 85 that calculates a drive command for the turning motor 88, an inverter 87, and a turning motor 88. The inverter 87 converts power supply electric power in accordance with the drive command calculated by the turning device control unit 85 and supplies the converted electric power to the turning motor 88. For example, the turning motor 88 may also be composed of an electromechanically integrated three-phase brushless motor, like the reaction force motor 78.

Rotation of the turning motor 88 is transmitted from the turning speed reducer 89 to the tire 99 via a pinion gear 96, a rack 97, a tie rod 98, and a knuckle arm 985. A rotational motion of the pinion gear 96 is converted into a linear motion of the rack 97, and the tie rods 98 provided at both ends of the rack 97 reciprocate the knuckle arm 985 to turn the tire 99.

The steering angle of the steering wheel 91 is defined depending on the direction of rotation with respect to the neutral position of the steering wheel 91, for example, as positive in a CW direction and negative in a CCW direction in FIG. 1. Corresponding to this definition, the sign of the turning angle of the tire 99 is defined. The torque sensor 94 detects a steering wheel torque Th input to the steering wheel 91 based on a torsional displacement of the torsion bar. The detection value Th of the torque sensor 94 is input to the reaction force device control unit 75.

The reaction force device control unit 75 and the turning device control unit 85 are mainly composed of a microcomputer or the like, and have a CPU, a ROM, a RAM, and an I/O (not shown), a bus line for connecting these components, and the like. Each process of the reaction force device control unit 75 and the turning device control unit 85 may be a software processing by executing a pre-stored program on the CPU, or may be hardware processing by a dedicated electronic circuit. The reaction force device control unit 75 and the turning device control unit 85 communicate information with each other via a vehicle network such as CAN communication or a dedicated communication line.

In the SBW system 901, the steering control device 201 includes the reaction force device control unit 75 and the inverter 77 of the reaction force device 70 and the turning device control unit 85 and the inverter 87 of the turning device 80. The steering control device 201 controls the reaction force motor 78 and the turning motor 88 to operate cooperatively.

A schematic control configuration of the reaction force device 70 and the turning device 80 will be described with reference to FIGS. 2A and 2B. A symbol of the parameter related to an output of the reaction force device 70 is denoted by "r", and a symbol of the parameter related to an output of the turning device 80 is denoted by "t". Values such as a rotation angle θr and a rotation angular velocity ωr of the reaction force motor 78 in the reaction force device 70 and a turning angle θt in the turning device 80 are converted values obtained by multiplying the gear ratios of the speed reducers 79 and 89. In the figure, the speed reducer is abbreviated as "gear". Also, the motor and the gear are represented in one block, and the symbols "78, 79" or "88, 89" are arranged side by side.

Figure 2A:
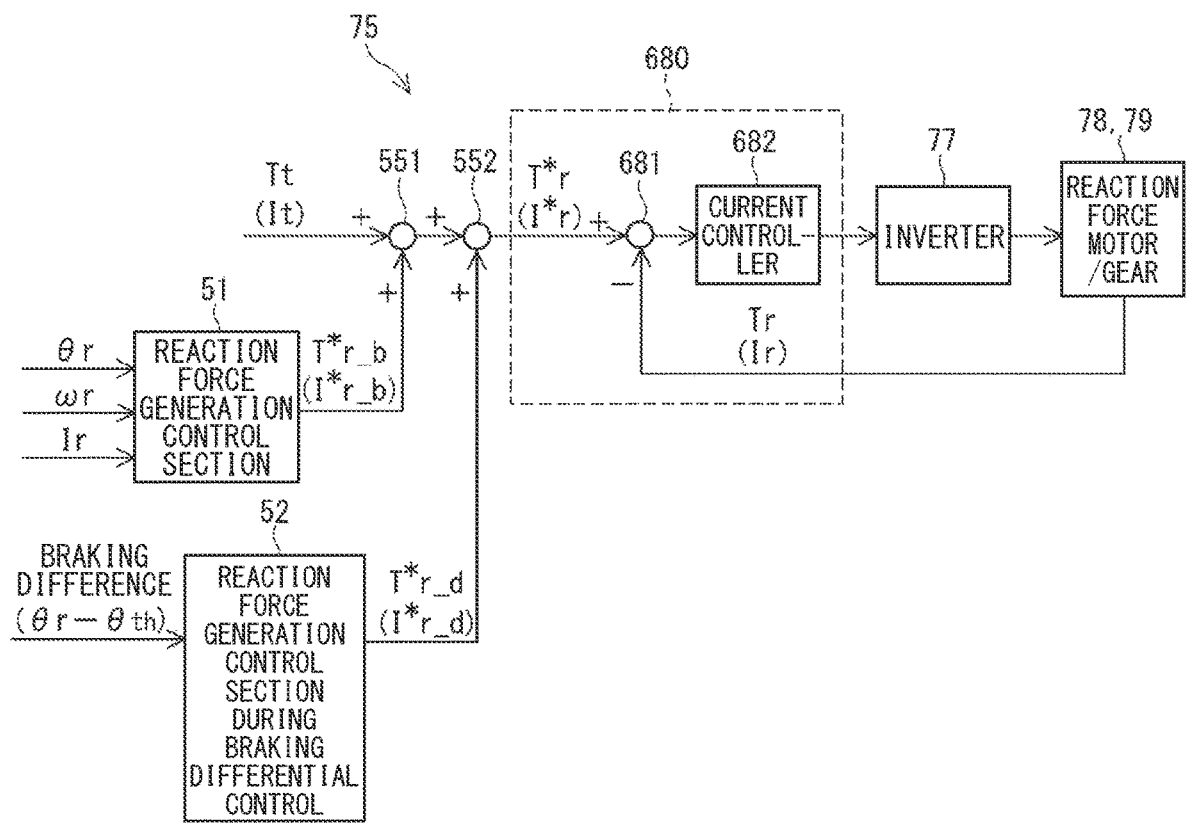
FIG. 2A is a control block diagram of a reaction force device in a steer-by-wire system.

FIG. 2A shows the control configuration of the reaction force device 70. Instead of the reaction force torque Tr as a control amount, the reaction force motor current Ir may be used as shown in parentheses. FIG. 2A describes that the reaction force torque Tr is used as the control amount.

The reaction force device control unit 75 includes a reaction force generation control section 51, a reaction force generation control section 52 during braking differential control, and a current control section 680. The reaction force generation control section 51 calculates a basic reaction force torque command value T*r_b based on the reaction force motor rotation angle θr, the rotation angular velocity ωr, and the reaction force motor current Ir. The reaction force generation control section 52 during braking differential control calculates a braking difference reaction force torque command value T*r_d based on a braking difference that is the difference between the reaction force motor rotation angle θr and an angle threshold value θth. Adders 551 and 552 add the basic reaction force torque command value T*r_b and the braking difference reaction force torque command value T*r_d to the turning torque Tt to calculate a reaction torque command value T*r.

The current control section 680 includes a deviation calculator 681 and a current controller 682, and generates a drive command to the reaction force motor 78 by feedback control of the reaction torque Tr. The Inverter 77 supplies powers to the reaction force motor 78 based on the output of current controller 682. The reaction torque Tr output from the reaction force motor 78 via the speed reducer 79 is fed back to the deviation calculator 681.

Figure 2B:
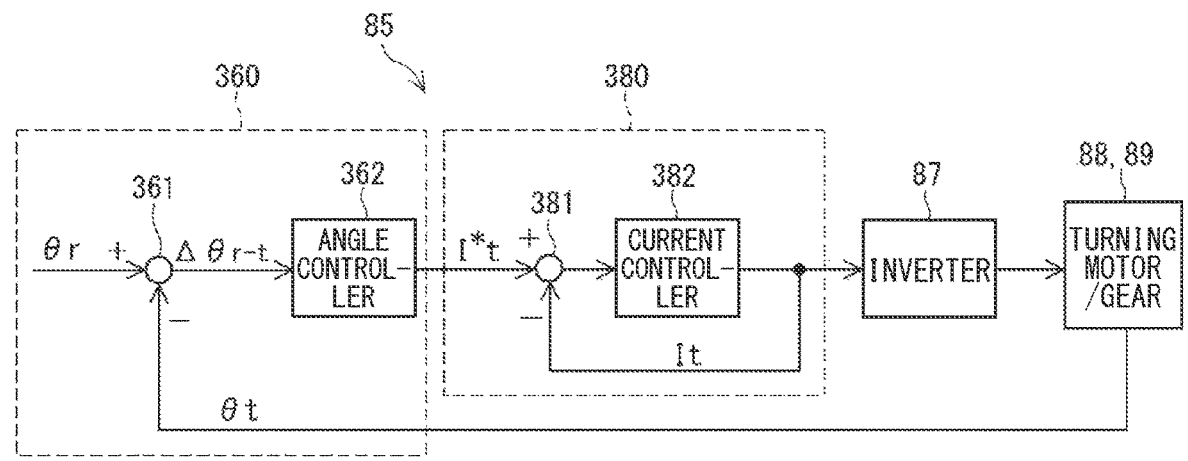
FIG. 2B is a control block diagram of a turning device in a steer-by-wire system.

FIG. 2B shows a control configuration of the turning device 80. A turning torque may be used instead of the turning motor current It described below. The turning device control unit 85 includes an angle control section 360 and a current control section 380. An angle deviation calculator 361 of the angle control section 360 calculates an angle deviation Δθr-t between the reaction force motor rotation angle θr and the turning angle θt communicated from the reaction force device 70. The angle controller 362 calculates the current command value I*t for the turning motor 88 so that the angle deviation Δθr-t approaches zero.

The current control section 380 includes a deviation calculator 381 and a current controller 382, and generates a drive command to the turning motor 88 by feedback control of the turning motor current It. The inverter 87 supplies power to the turning motor 88 based on the output of the current controller 382. The turning angle θt output from the turning motor 88 via the speed reducer 89 is fed back to the angle deviation calculator 361.

The above is a description of the control configuration of the steering control device 201 during the normal operation. During normal operation, the reaction force device control unit 75 calculates the reaction force torque based on the steering information such as the steering angle and steering torque, and the turning information such as the turning angle and rack stroke, so that the driver can get an appropriate steering feeling. On the other hand, as shown in FIG. 1, the reaction force device control unit 75 also functions as a "steering wheel lock calculating unit 75" while the vehicle is parked. That is, when a predetermined condition is satisfied while the vehicle is parked or stopped, the steering wheel lock calculating unit 75 calculates a drive command so as to output a lock torque for maintaining the rotation stop state of the steering wheel 91 by energizing the reaction force motor 78.

As information for judging whether or not the "predetermined condition" is satisfied, an ignition (IG) signal, a ready signal, a vehicle unlocking/locking signal, a door open/close signal, a key operation signal, and the like are input to the steering wheel lock calculating unit 75 via the vehicle network. The meaning of information indicated by these signals will be described later.

Figure 3:
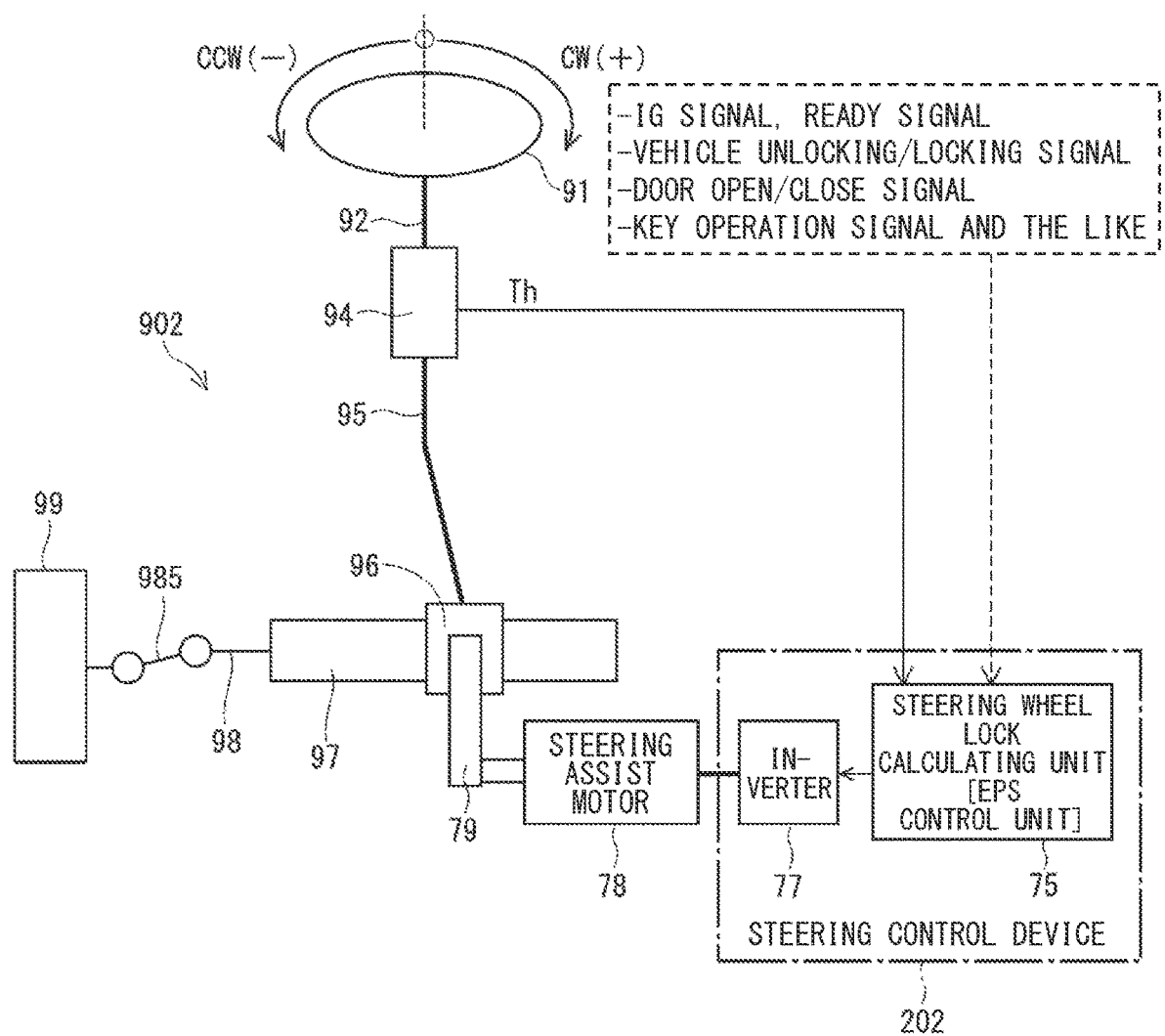
FIG. 3 is an overall configuration diagram of an electric power steering system to which the steering control device of the present embodiment is applied.

FIG. 3 shows the overall configuration of the EPS system 902 in which the steering mechanism and the turning mechanism are mechanically coupled. Although FIG. 3 shows a rack-assist type EPS system, the same applies to a column-assist type EPS system. In the EPS system 902, the steering shaft 92 and the rack 97 are connected by an intermediate shaft 95. Rotation of the steering shaft 92 by steering by the driver is mechanically transmitted to the rack 97 via the intermediate shaft 95 and the pinion gear 96.

The EPS system 902 includes a steering assist motor 78 as a "steering motor." A steering control device 202 of the EPS system 902 is composed of an EPS control unit 75 and the inverter 77. During the normal operation, the EPS control unit 75 calculates a drive command for the steering assist motor 78 so as to apply steering assist torque to the steering wheel 91.

The EPS control unit 75 functions as a "steering wheel lock calculating unit 75" while the vehicle is parked or stopped. When a predetermined condition is satisfied while the vehicle is parked or stopped, the steering wheel lock calculating unit 75 of the EPS system 902 calculates a drive command so as to output a lock torque for maintaining the rotation stop state of the steering wheel 91 by energizing the steering assist motor 78. In other words, the EPS control unit 75, which functions to turn the vehicle according to the steering by the driver during the normal operation, has another function of locking the steering wheel while the vehicle is parked or stopped.

As described above, in the steering control devices 201 and 202 applied to the SBW system 901 or the EPS system 902, when a predetermined condition is satisfied while the vehicle is parked or stopped, the steering wheel lock calculating unit 75 calculates a drive command so as to output a lock torque that maintains the rotation stop state of the steering wheel 91 by energizing the steering motor 78. This motor control by the steering wheel lock calculating unit 75 is called "steering wheel lock drive control". In the present embodiment, the steering wheel lock calculating unit 75 performs the steering wheel lock drive control, so a mechanical steering wheel lock device is not required.

[Configuration of Steering Wheel Lock Calculating Unit]

Next, with reference to FIGS. 4 to 7, first to fourth embodiments regarding the specific configuration of the steering wheel lock calculating unit 75 will be described. In the reference numerals of the steering wheel lock calculating unit of each embodiment, the number of the embodiment is attached to the third digit following the numeral "75". In FIGS. 4 to 7, the same reference numerals are assigned to substantially the same configurations as in FIG. 2A, and the description thereof is omitted. Also, the symbol "r" of the reaction force device control unit is shared with the EPS control unit.

The drive command output to the inverter 77 in each figure corresponds to the manipulated variable (for example, voltage command) of feedback control in which torque and current are controlled variables, as shown in FIG. 2A. FIGS. 4 to 7 are intended to show configuration patterns of steering wheel lock drive control, and description of specific operation amounts output to the inverter 77 is omitted. The manipulated variables for controlling the torque and current may be appropriately selected according to the control configuration such as PWM control, and blocks such as conversion units may be added as necessary.

First Embodiment

Figure 4:
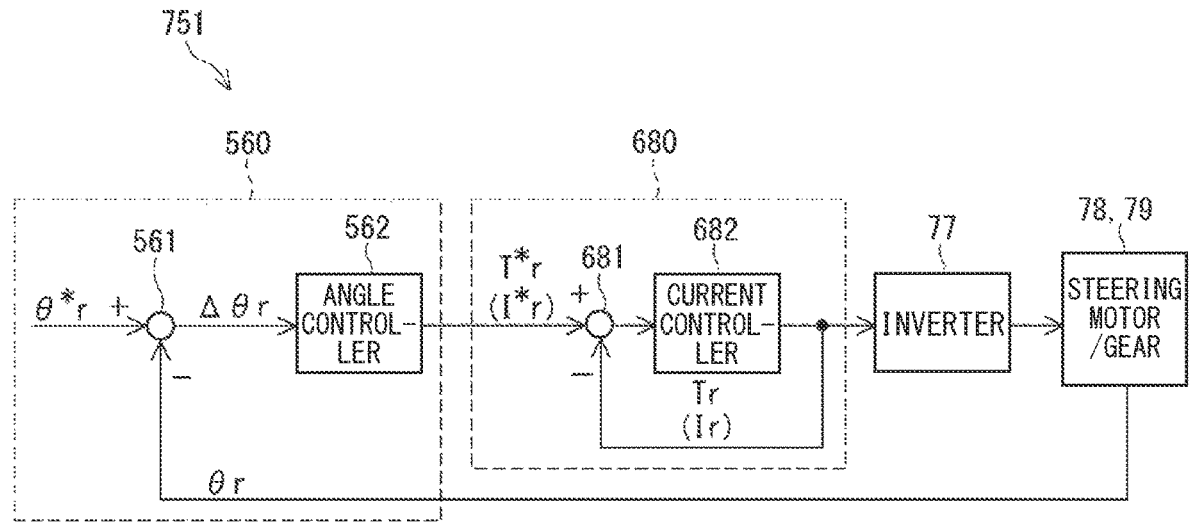
FIG. 4 is a block diagram showing the configuration of a steering wheel lock calculating unit according to a first embodiment.

The steering wheel lock calculating unit 751 in the first embodiment shown in FIG. 4 calculates a drive command so that the rotation angle θr of the steering motor 78 follows the rotation angle command value θ*r, and controls so that the rotation angle θr of the steering motor 78 is maintained at a constant value. Hereinafter, the rotation angle θr of the steering motor 78 is simply referred to as "rotation angle θr". The rotation angle command value θ*r may be set to 0 as a value corresponding to the neutral position, or may be a positive or negative value other than 0. As described above, the rotation angle θr is expressed as a converted value multiplied by the gear ratio of the speed reducer 79.

The steering wheel lock calculating unit 751 includes an angle control section 560 and a current control section 680. An angle deviation calculator 561 of the angle control section 560 calculates an angle deviation Δθr between the rotation angle command value θ*r and the rotation angle θr fed back from the steering motor 78 via the speed reducer 79. An angle controller 562 calculates torque command value T*r or current command value I*r so that angle deviation Δθr approaches zero. The current control section 680 calculates a drive command by feedback control of torque Tr or current Ir.

Second Embodiment

Figure 5:
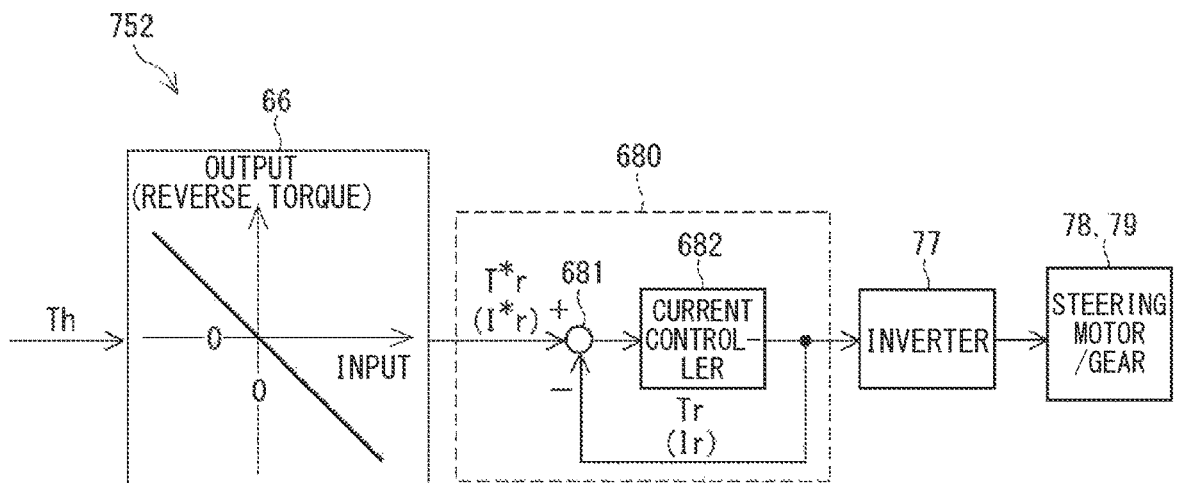
FIG. 5 is a block diagram showing the configuration of a steering wheel lock calculating unit according to a second embodiment.

A steering wheel lock calculating unit 752 of the second embodiment shown in FIG. 5 calculates a drive command so that the steering motor 78 outputs a reverse torque that cancels out the input steering wheel torque Th. Therefore, ideally, the initial rotation angle at the start of steering wheel lock drive control is maintained.

The steering wheel lock calculating unit 752 includes a reverse torque calculator 66 and a current control section 680. The reverse torque calculator 66 calculates a torque command value T*r or a current command value I*r so as to cancel out the steering wheel torque Th. The current control section 680 calculates a drive command by feedback control of torque Tr or current Ir.

Third Embodiment

Figure 6:
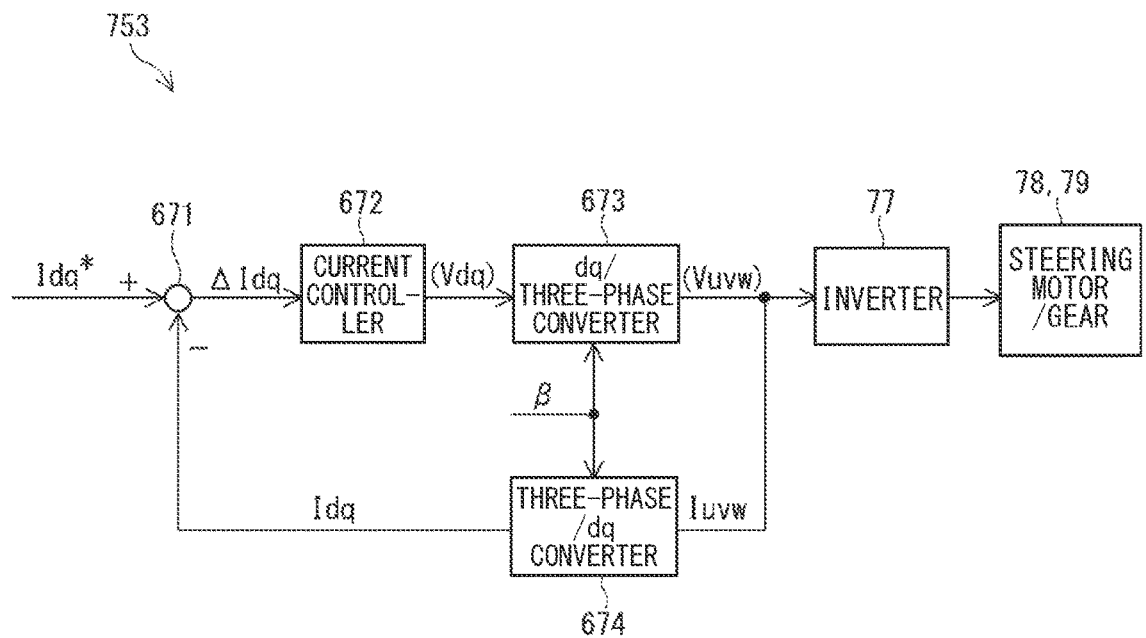
FIG. 6 is a block diagram showing the configuration of a steering wheel lock calculating unit according to a third embodiment.

A steering wheel lock calculating unit 753 of the third embodiment shown in FIG. 6 controls the driving of the three-phase motor by vector control, fixes the electrical angle β of the dq-axis current vector Idq energized to the steering motor 78, and then calculates the drive command. That is, the steering wheel lock calculating unit 753 energizes the steering motor 78 so that the rotor position is within a predetermined range.

A dq-axis current command value Idq* having a value other than 0 for the q-axis current and a value 0 for the d-axis current is input to the steering wheel lock calculating unit 753. A dq-axis current deviation calculator 671 calculates a deviation ΔIdq between the dq-axis current command value Idq* and the dq-axis current Idq fed back from the three-phase/dq converter 674. A current controller 672 calculates a dq-axis voltage command Vdq so that the dq-axis current deviation ΔIdq approaches zero.

A dq/three-phase converter 673 performs coordinate conversion on the dq-axis voltage command Vdq to calculate a three-phase voltage command Vuvw, and outputs it to the inverter 77. The three-phase/dq converter 674 performs coordinate conversion on the three-phase current Iuvw flowing through the inverter 77, calculates the dq-axis current Idq, and feeds it back to the dq-axis current deviation calculator 671. Here, since the fixed electrical angle β is used in the calculations of the dq/three-phase converter 673 and the three-phase/dq converter 674, the rotor position is maintained.

The same electrical angle β appears multiple times within the movable range of the steering wheel 91 because one cycle of the rotation angle includes a cycle of the number of electrical angles according to the number of magnetic pole pairs of the brushless motor that constitutes the steering motor 78. Therefore, in the third embodiment, it is effective in maintaining the rotor position within a relatively small angle range on the premise that the steering wheel 91 is not largely rotated after the handle lock is started.

Fourth Embodiment

Figure 7:
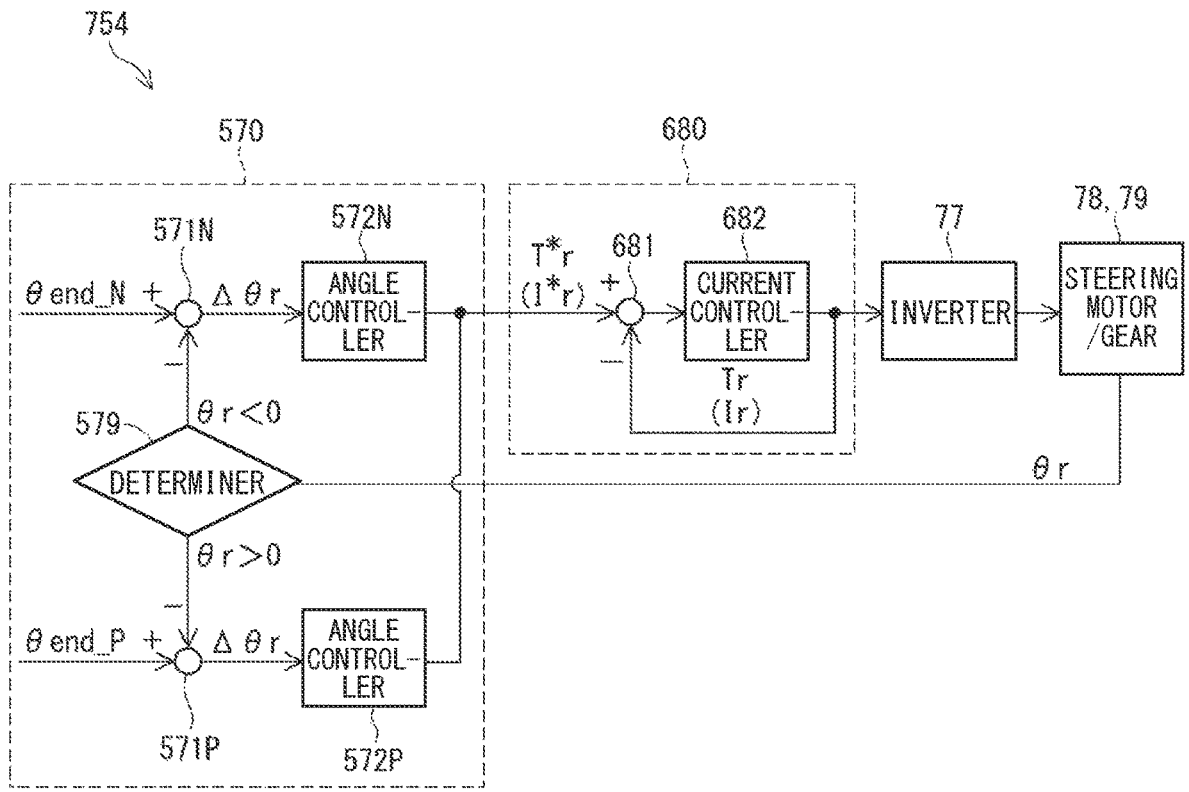
FIG. 7 is a block diagram showing the configuration of a steering wheel lock calculating unit according to a fourth embodiment.

A steering wheel lock calculating unit 754 of the fourth embodiment shown in FIG. 7 corresponds to a special form of the first embodiment that maintains the motor rotation angle at a constant value, and calculates a drive command using the rotation angle θr of the steering motor 78 corresponding to the end, which is the limit of the steering angle, as the rotation angle command value θ*r.

Motorcycles and buggies may be parked with the steering wheel 91 turned to either the positive or negative end with respect to the neutral position. For example, if it is determined in advance whether the steering wheel is to be locked at the positive or negative end, and the driver always turns the steering wheel 91 close to the end on the lock side to start the control, it is also possible to slightly rotate the steering motor 78 according to the first embodiment.

On the other hand, if the driver is unsure of which side to turn the steering wheel 91 each time the vehicle is parked or stopped, it is not realistic to rotate the steering wheel 91 from the current position to the opposite end. Therefore, in the fourth embodiment, control is performed so that the steering wheel is locked in a state in which it is rotated to the end on the near side according to the current rotation angle θr.

The steering wheel lock calculating unit 754 includes an angle control section 570 having a negative end angle θend_N and a positive end angle θend_P as rotation angle command values, and a current control section 680. A determiner 579 of the angle control section 570 determines whether the rotation angle θr fed back from the steering motor 78 is positive or negative. Here, the rotation angle θr is "θend_N≤θr≤θend_P".

A negative angle deviation calculator 571N calculates a negative angle deviation Δθr by subtracting the negative rotation angle θr from the negative end angle θend_N. A positive angle deviation calculator 571P calculates a positive angle deviation Δθr by subtracting the positive rotation angle θr from the positive end angle θend_P. The angle controllers 572N and 572P calculate the torque command value T*r or the current command value I*r so that the angle deviation Δθr approaches zero.

As in the first embodiment, the current control section 680 calculates a drive command by feedback control of torque Tr or current Ir. As a result, the steering wheel lock drive control is executed so that the steering wheel is pressed against the end on the same side as the current position.

[Applied Control]

As described above, in the present embodiments, an electric steering wheel lock mechanism is realized by energizing the steering motor 78 for a purpose different from that during the normal operation. This mechanism eliminates the need for a mechanical steering wheel lock device and effectively secures the space around the steering wheel. In the future, it is expected that this effect will become even greater as the number of new human interfaces mounted increases in the vehicle. However, compared to a mechanical mechanism that maintains the locked state until it is unlocked once locked, the present embodiment has a new problem peculiar to the electrical mechanism. Therefore, next, with reference to FIGS. 8 to 10, applied control of the steering wheel lock drive control will be described.

It is assumed that a "phenomenon" may occur in which a steering wheel torque Th larger than the lock torque output by the steering motor 78 is input during the steering wheel lock drive control. In a period from time t1 to t4 in the time chart of FIG. 8, the operation when the steering wheel torque Th exceeding the lock torque is input during the steering wheel lock drive control is shown. At an initial stage before time t1, the steering wheel angle (that is, the motor rotation angle after gear ratio multiplication) is maintained at an initial angle. In the first and fourth embodiments using the rotation angle command value, the initial angle corresponds to the initial value θ*r_0 of the rotation angle command value.

After time t1, the input of the steering wheel torque Th is started. Since the input steering wheel torque Th is equal to or less than the lock torque output from the steering motor 78 until time t2, the steering wheel angle does not change. However, after time t2, the input steering wheel torque Th exceeds the lock torque output from the steering motor 78, and the steering wheel 91 begins to rotate. After that, at time t3, the input steering wheel torque Th falls below the lock torque, and the rotation of the steering wheel 91 stops. The steering wheel angle at time t3 is θr_#.

After that, when continuing the steering wheel lock drive control, the steering wheel lock calculating unit 75 can execute the following two types of control, for example. In a control indicated by (*a), the steering wheel lock calculating unit 75 continues the steering wheel lock drive control so as to maintain the steering wheel angle θr_# after rotation of the steering wheel. This control is applicable to all of the first to fourth embodiments.

In a control indicated by (*b), the steering wheel lock calculating unit 75 returns the steering wheel angle to the initial value θ*r_0 of the rotation angle command value from time t3 to t4, and continues the steering wheel lock drive control. This control can be applied to the first and fourth embodiments using the rotation angle command value, and even if the steering wheel torque Th exceeding the lock torque is repeatedly input in the same direction, it is possible to prevent the steering wheel angle from greatly deviating from the initial angle.

Figure 8:
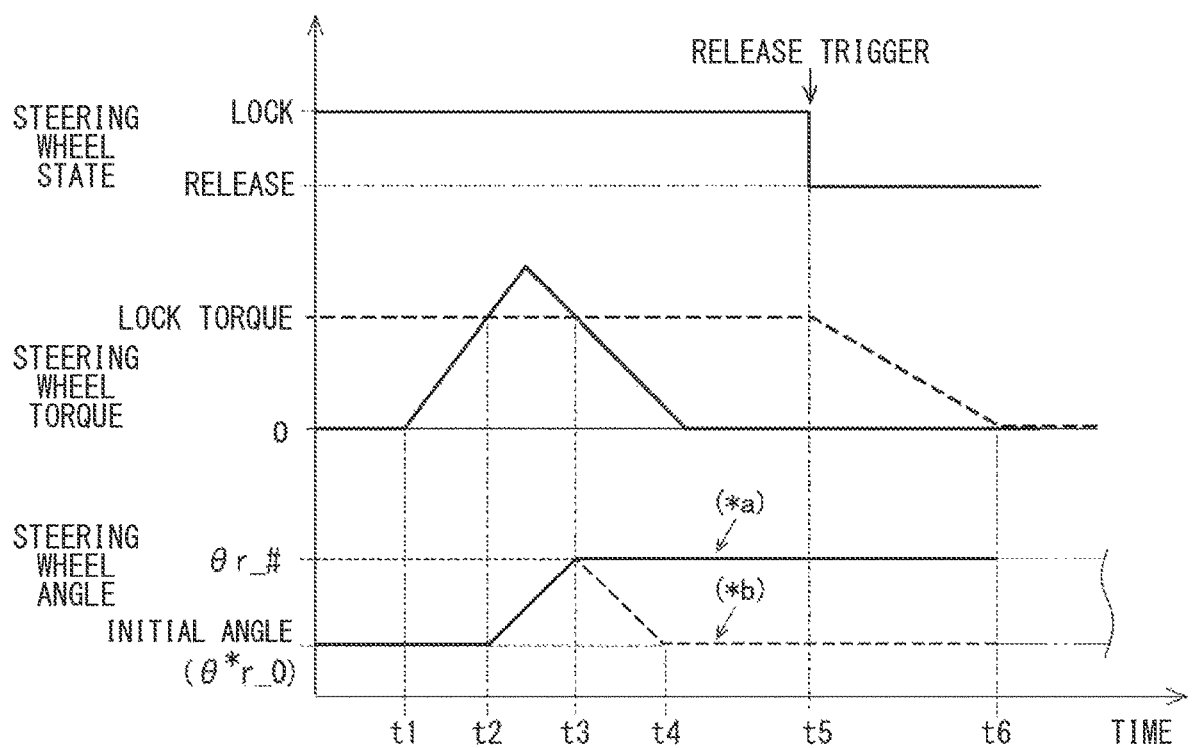
FIG. 8 is a time chart showing an operation when a steering wheel torque exceeding a lock torque is input during controlling a steering wheel lock drive and an operation when the steering wheel lock is released.

Subsequently, in the period from time t5 to t6 in the time chart of FIG. 8, the operation when the handle lock is released is shown. At time t5 during the continuation of the steering wheel lock drive control, the steering wheel lock calculating unit 75 receives a release trigger from the vehicle and terminates the steering wheel lock drive control. At this time, the steering wheel lock calculating unit 75 gradually decreases the lock torque output by the steering motor 78 over time t5 to t6. For example, if the lock torque is instantly reduced to 0 while the driver is holding the steering wheel 91 with his/her hand, the driver may inadvertently rotate the steering wheel 91. Therefore, by gradually decreasing the lock torque, the driver can be made to recognize that the lock has been released.

Next, prevention of heat generation due to continuation of steering wheel lock drive control will be described. According to the first embodiment, when the rotation angle θr reaches the command value θ*r and the tires 99 are stationary due to friction with the road surface, the inverter 77 and the steering motor 78 are no longer energized. Further, in the second embodiment, the inverter 77 and the steering motor 78 are not energized unless the steering wheel torque Th is input, so the possibility of heat generation is considered to be low.

However, for example, when the driver falls asleep with his weight on the steering wheel 91 during parking, the steering wheel torque Th continues to be input, and there is a possibility that the energization by the steering wheel lock drive control will continue for a long time. Moreover, since a specific phase of the three-phase motor is continuously energized in order to maintain the rotation angle θr, there is a risk that heat will concentrate on a switching element of the specific phase of the inverter 77. Therefore, it is preferable that the steering wheel lock calculating unit 75 changes the energized phase according to the energization time so as to avoid concentration of energization on a specific phase of the steering motor 78 during the steering wheel lock drive control.

Figure 9:
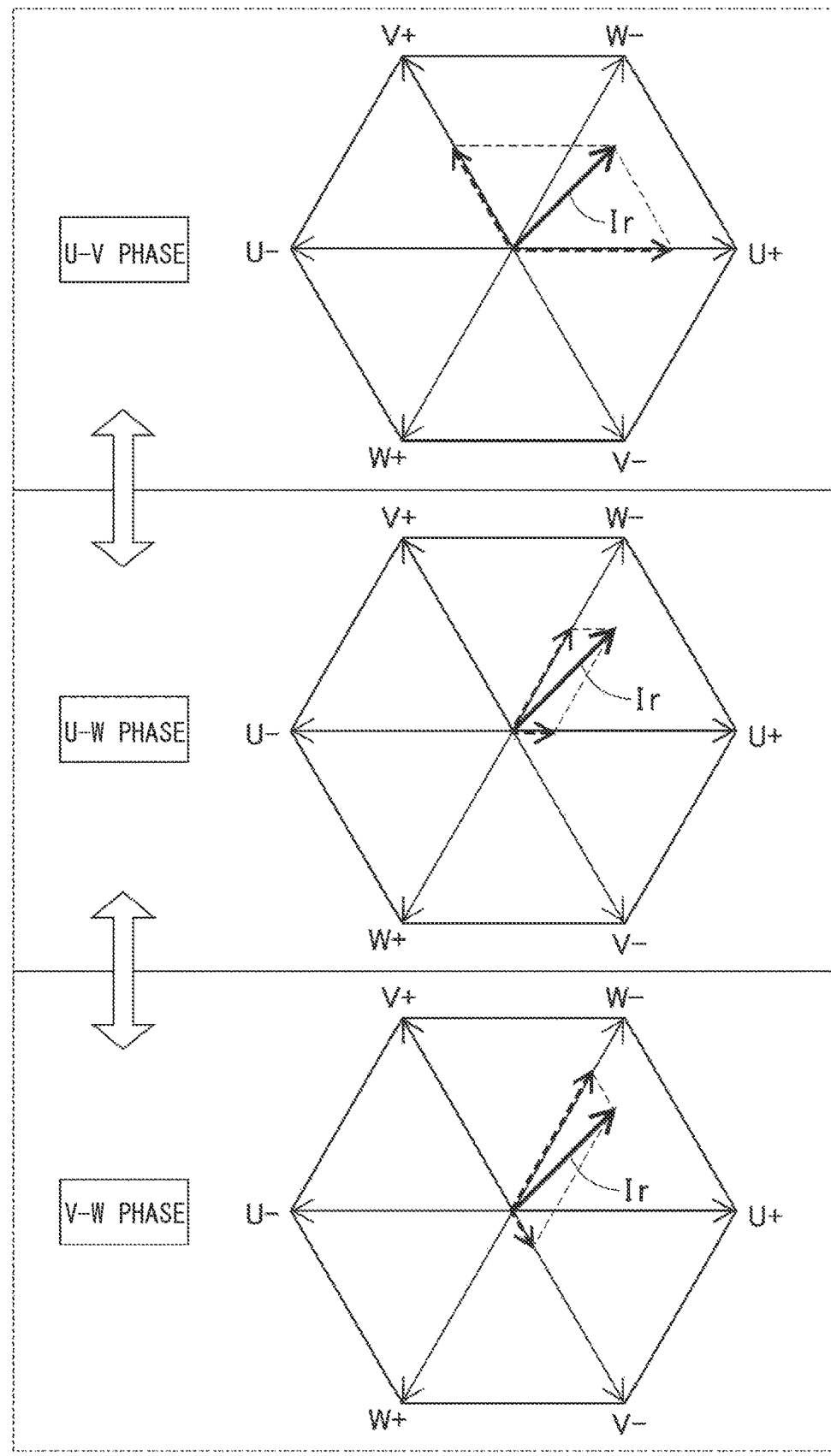
FIG. 9 is a space vector diagram for explaining energized phase switching during controlling the steering wheel lock drive.

For example, in the method shown in FIG. 9, the three-phase voltage is represented by the space vector system. In order to obtain the current vector Ir that realizes the lock angle, the heat is dispersed by sequentially switching the three modes of synthesizing the UV phase vector, synthesizing the UW phase vector, and synthesizing the VW phase vector.

Alternatively, the steering motor 78 may be oscillated by gradually shifting the lock angle according to the energization time. FIG. 10 shows a transition table in which energization to two phases out of three phases is sequentially performed while interchanging the phases. For example, the lock angle can be maintained within a predetermined angle range by alternately switching forward and reverse energization in six modes.

[Activation/Release Processing]

Next, with reference to the flow charts of FIGS. 11 to 13, an example of processing for activation/release for the steering wheel lock drive control will be described. In the description of the flowchart, a symbol "S" indicates a step. The substantially same step as that in each flowchart is denoted by the same step number, and the description thereof is omitted. Hereinafter, a person other than the authorized driver who gets into the vehicle is referred to as a "suspicious person" who is likely to attempt to steal the vehicle.

Figure 11:
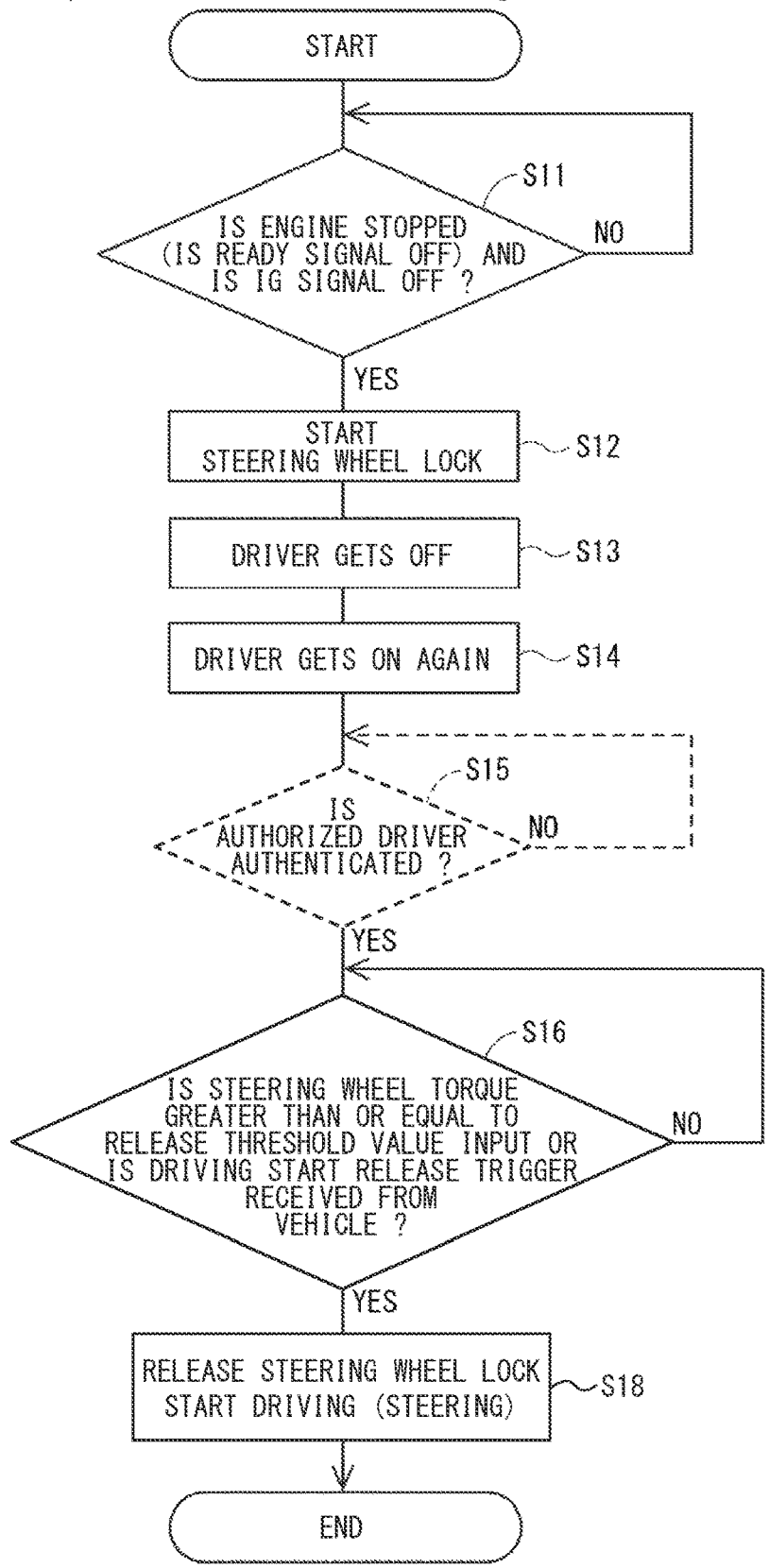
FIG. 11 is a flow chart showing a first example of activation/release processing of steering wheel lock drive control.

FIG. 11 shows a flow chart as "processing example 1", in which a flow from parking to starting driving by an authorized driver, which is common to the SBW system 901 and the EPS system 902, is assumed. In S11, the steering wheel lock calculating unit 75 determines whether the engine is stopped or the ready signal is off and the ignition signal is off. If YES in S11, the steering wheel lock calculating unit 75 starts the steering wheel lock drive control in S12. Then, it is assumed that the driver gets off the vehicle in S13 and, after a certain period of time has passed, get on the vehicle again in S14.

For example, when it is recognized that a person has got on the vehicle due to the signal for unlocking the vehicle or opening the driver's door, in S15, the authorized driver may be authenticated, and only in the case of YES, the process may proceed to S16. In S16, the steering wheel lock calculating unit 75 determines whether or not a steering wheel torque Th greater than or equal to a release threshold value is input during steering wheel lock drive control, or a "driving start release trigger" such as an IG ON signal or a key operation signal has been received from the vehicle. In the case of YES in S16, in S18, the steering wheel lock calculating unit 75 stops the steering wheel lock drive control, and the lock is released. This enables the driver to drive including steering. A state in which only straight running is possible is not considered to be drivable.

By the way, it is assumed that the driver applies the steering wheel torque Th after unlocking in S18 based on other conditions before the IG is turned on. In the EPS system 902, even before the IG is turned on and the assist is not started, the steering wheel 91 is mechanically coupled to the turning mechanism so that a rotational resistance is generated.

On the other hand, in the SBW system 901, if the lock is released before the reaction force motor 78 is in a state capable of outputting the reaction force torque during normal operation, when the steering wheel torque Th is applied, the steering wheel is mechanically separated from the turning mechanism, and will idle without resistance. For example, there is a risk that a driver who has the illusion that the steering wheel 91 is fixed puts his/her weight on the steering wheel 91, causing the steering wheel 91 to spin and lose balance. Therefore, in the SBW system 901, the steering wheel lock calculating unit 75 preferably continues the steering wheel lock drive control until the reaction force motor 78 is ready to output the reaction torque after the driver gets on the vehicle.

Therefore, in the above description, although "FIG. 11 is common to the SBW system 901 and the EPS system 902", it is rather suitable for the EPS system 902. Reflecting the above content, FIG. 12 shows a flowchart assuming the prevention of wheel slipping when the driver gets on the vehicle in the SBW system 901 as "processing example 2".

Figure 12:
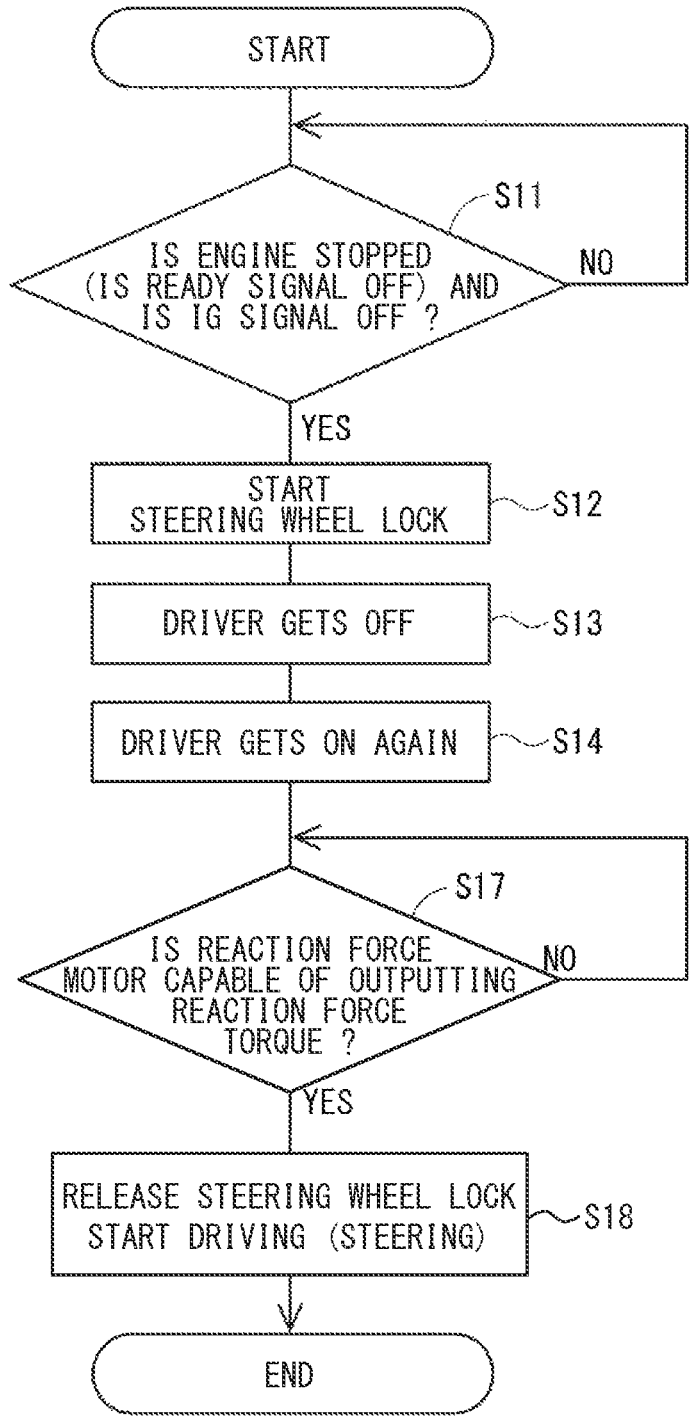
FIG. 12 is a flow chart showing a second example of activation/release processing of steering wheel lock drive control.

S11 to S14 in FIG. 12 are the same as those in FIG. 11. However, in FIG. 12, the release step of S16 in FIG. 11 is not adopted, and instead of S16, it is determined in S17 whether the reaction force motor 78 is in a state capable of outputting reaction force torque. In the case of YES in S17, in S18, the steering wheel lock calculating unit 75 stops the steering wheel lock drive control, and releases the lock. If the IG ON signal or key operation signal is used as a condition for starting the normal operation of the reaction force device 70, it may be considered that the determination of S17 includes the determination for receiving the driving start release trigger.

In fact, in a state where the link between the steering mechanism and the turning mechanism of the SBW system 901 is cut, even if the steering wheel lock is released, unless the reaction force device 70 starts normal operation, a suspicious person cannot steer the steering wheel 91 to steal the vehicle. In other words, there is no point in locking the steering wheel only for theft prevention. Rather, from the viewpoint of assisting the driver's actions when getting on the vehicle, the processing of FIG. 12 can improve the safety and convenience of the SBW system 901 when the driver is getting on the vehicle.

If the energization for steering wheel lock drive control is always done, the battery may run out when the vehicle is parked for a long period of time. In order to prevent this problem, it is conceivable to shift to a "sleep mode" in which the steering wheel lock drive control is suspended while the vehicle is parked when no one is on board. Also, if a torque input or a change in steering wheel angle is detected during the sleep mode, a processing of canceling the sleep mode can be considered. Therefore, FIG. 13 shows a flowchart assuming processing from transition to sleep mode to re-locking of the steering wheel, which is common to the SBW system 901 and the EPS system 902, as "processing example 3".

S21 is the "state in which the steering wheel is locked" following S12 in FIGS. 11 and 12, that is, the state after the start of steering wheel lock drive control. In S22, the steering wheel lock calculating unit 75 determines whether a "sleep mode release trigger" such as a vehicle lock signal has been received from the vehicle, or whether a predetermined time has passed without steering wheel torque Th input. In the case of YES in S22, in S23, the steering wheel lock calculating unit 75 stops the steering wheel lock drive control and shifts to the sleep mode. In the sleep mode, the steering control devices 201 and 202 are entirely placed in a resting state, and power supply to the steering motor 78 is stopped. Therefore, the lock is released.

In S24, [Case 1] and [Case 2] are mainly assumed as events during the sleep mode. Case 1 is when the driver is about to get on the vehicle, or when he gets on the vehicle in the SBW system 901, and Case 2 is when a suspicious person gets on the vehicle and tries to move the steering wheel 91. As in the example of FIG. 12, for the case 1, there is a need to re-lock the steering wheel in order to prevent the steering wheel 91 from slipping. For case 2, there is a need to re-lock the steering wheel in order to prevent vehicle theft.

In S24, the steering wheel lock calculating unit 75 determines whether there is a change in the rotation angle of the steering motor 78 or an input of the steering wheel torque Th, or whether an activation trigger has been received from the vehicle. Examples of activation triggers in Case 1 include signals such as remote operation of a smart key, vehicle unlocking, door opening, and driver authentication by a driver. Examples of activation triggers in Case 2 include signals such as vehicle unlocking, door opening, suspicious person detection, anti-theft alarm, vibration sensor detection, electric tilt operation, and key non-detection.

In the case of YES in S24, the steering control devices 201 and 202 are activated in S25, and in S26, the steering angle detection function, for example, is confirmed as the activation function. In particular, by receiving a remote control signal of a smart key or the like as the activation trigger and confirming the function at activation in advance, the waiting time until the function starts can be shortened. After S26, in S27, the steering wheel lock calculating unit 75 starts the steering wheel lock drive control. By re-locking the steering wheel in this way, it is possible to prevent the steering wheel from slipping in the SBW system 901 and to prevent the vehicle from being stolen by a suspicious person.

Other Embodiments (A) Any one of the rotation angle control, reverse torque output, and electrical angle fixed control methods shown in the first to third embodiments is not necessarily selected, and two or more control methods are combined. For example, by providing a control arbitration unit, processing such as giving priority to one of the control methods depending on the scene, or performing a weighted average of a plurality of control outputs may be performed.

(B) The activation trigger and release trigger received by the steering wheel lock calculating unit from the vehicle are not limited to those exemplified in the above embodiments, and may be any signal that can be used for activation/release processing. Also, the activation/release trigger may be customized according to the specifications of the vehicle in which it is installed and the specifications of options.

(C) The application of the present disclosure is further expanded by coordinated control with other systems of the vehicle. For example, even if a vehicle is attempted to be stolen, the behavior of the suspicious person can be tracked by analyzing the operation of the steering wheel lock calculating unit while the vehicle is parked, which may be useful in criminal investigations.

(D) In a form using the electrical angle of the dq-axis current vector or an embodiment in which the energization phase is switched according to the energization time, a multiphase motor other than the three-phase motor may be used as the steering motor. Also, except for those embodiments, the steering motor is not limited to a polyphase motor, and a DC motor may be used. When a DC motor is used, an H-bridge circuit is used as a power converter instead of an inverter.

The present disclosure is not limited to such embodiments but can be implemented in various forms without deviating from the spirit of the present disclosure.

The control unit and the technique according to the present disclosure may be achieved by a dedicated computer provided by constituting a processor and a memory programmed to execute one or more functions embodied by a computer program. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A steering control device for controlling a drive of a reaction motor that applies reaction torque to a steering wheel in a steer-by-wire system in which a steering mechanism and a turning mechanism are mechanically separated, or for controlling a drive of a steering motor that functions as a steering assist motor that applies steering assist torque to a steering wheel in an electric power steering system in which a steering mechanism and a steering mechanism are mechanically coupled, comprising:
   a steering wheel lock calculating unit configured to perform a steering wheel lock drive control for calculating a drive command so as to output a lock torque for maintaining a rotation stop state of the steering wheel by energizing the steering motor when a predetermined condition is satisfied while a vehicle is parked or stopped; and
   a power converter configured to convert power supply electric power according to the drive command calculated by the steering wheel lock calculating unit and supplies the electric power to the steering motor, wherein
   during the steering wheel lock drive control, when the steering wheel is rotated by a steering wheel torque exceeding a lock torque output by the steering motor, the steering wheel lock calculating unit continues the steering wheel lock drive control so as to maintain a steering wheel angle after rotation of the steering wheel.

2. The steering control device according to claim 1, wherein
   the steering wheel lock calculating unit calculates the drive command so that a rotation angle of the steering motor follows a rotation angle command value.

3. The steering control device according to claim 1, wherein
   the steering wheel lock calculating unit calculates the drive command so that the steering motor outputs a counter torque that cancels out an input steering wheel torque.

4. The steering control device according to claim 1, wherein
   the steering motor is a polyphase motor, and
   the steering wheel lock calculating unit calculates the drive command by fixing an electrical angle β of a dq-axis current vector energized to the steering motor.

5. A steering control device for controlling a drive of a reaction motor that applies reaction torque to a steering wheel in a steer-by-wire system in which a steering mechanism and a turning mechanism are mechanically separated, or for controlling a drive of a steering motor that functions as a steering assist motor that applies steering assist torque to a steering wheel in an electric power steering system in which a steering mechanism and a steering mechanism are mechanically coupled, comprising:
   a steering wheel lock calculating unit configured to perform a steering wheel lock drive control for calculating a drive command so as to output a lock torque for maintaining a rotation stop state of the steering wheel by energizing the steering motor when a predetermined condition is satisfied while a vehicle is parked or stopped; and
   a power converter configured to convert power supply electric power according to the drive command calculated by the steering wheel lock calculating unit and
supplies the electric power to the steering motor,
wherein the steering wheel lock calculating unit calculates the
drive command so that a rotation angle of the steering
motor follows a rotation angle command value, during the steering wheel lock drive control, when the
steering wheel is rotated by a steering wheel torque
exceeding a lock torque output by the steering motor, the steering wheel lock calculating unit returns the steering wheel to a steering wheel angle based on an initial
value of the rotation angle command value to continue
the steering wheel lock drive control.

6. The steering control device according to claim 2,
wherein the steering wheel lock calculating unit calculates the
drive command using the rotation angle of the steering
motor corresponding to an end, which is a limit of a
steering angle, as the rotation angle command value.

7. A steering control device for controlling a drive of a
reaction motor that applies reaction torque to a steering
wheel in a steer-by-wire system in which a steering mechanism and a turning mechanism are mechanically separated,
or for controlling a drive of a steering motor that functions
as a steering assist motor that applies steering assist torque
to a steering wheel in an electric power steering system in
which a steering mechanism and a steering mechanism are
mechanically coupled, comprising:

a steering wheel lock calculating unit configured to perform a steering wheel lock drive control for calculating
a drive command so as to output a lock torque for
maintaining a rotation stop state of the steering wheel
by energizing the steering motor when a predetermined
condition is satisfied while a vehicle is parked or
stopped; and a power converter configured to convert power supply
electric power according to the drive command calculated by the steering wheel lock calculating unit and
supplies the electric power to the steering motor,
wherein the steering motor is a polyphase motor, and while the steering wheel lock drive control is being
performed, the steering wheel lock calculating unit
switches an energized phase according to an energized
time so as to avoid concentration of energization on a
specific phase of the steering motor.

8. A steering control device for controlling a drive of a
reaction motor that applies reaction torque to a steering
wheel in a steer-by-wire system in which a steering mechanism and a turning mechanism are mechanically separated,
or for controlling a drive of a steering motor that functions
as a steering assist motor that applies steering assist torque
to a steering wheel in an electric power steering system in
which a steering mechanism and a steering mechanism are
mechanically coupled, comprising:

a steering wheel lock calculating unit configured to perform a steering wheel lock drive control for calculating
a drive command so as to output a lock torque for
maintaining a rotation stop state of the steering wheel
by energizing the steering motor when a predetermined
condition is satisfied while a vehicle is parked or
stopped; and a power converter configured to convert power supply
electric power according to the drive command calculated by the steering wheel lock calculating unit and
supplies the electric power to the steering motor,
wherein after a start of the steering wheel lock drive control, when
a sleep mode release trigger is received from the
vehicle or when a predetermined time has passed
without input of steering wheel torque, the steering wheel lock calculating unit stops the steering
wheel lock drive control and shifts to a sleep mode.

9. The steering control device according to claim 8,
wherein the steering wheel lock calculating unit is activated when
there is a change in a rotation angle of the steering
motor or an input of the steering wheel torque during
the sleep mode, and starts the steering wheel lock drive
control.

10. The steering control device according to claim 8,
wherein the steering wheel lock calculating unit is activated when
an activation trigger is received from the vehicle during
the sleep mode, and starts the steering wheel lock drive
control.

11. A steering control device for controlling a drive of a
reaction motor that applies reaction torque to a steering
wheel in a steer-by-wire system in which a steering mechanism and a turning mechanism are mechanically separated,
or for controlling a drive of a steering motor that functions
as a steering assist motor that applies steering assist torque
to a steering wheel in an electric power steering system in
which a steering mechanism and a steering mechanism are
mechanically coupled, comprising:

a steering wheel lock calculating unit configured to perform a steering wheel lock drive control for calculating
a drive command so as to output a lock torque for
maintaining a rotation stop state of the steering wheel
by energizing the steering motor when a predetermined
condition is satisfied while a vehicle is parked or
stopped; and a power converter configured to convert power supply
electric power according to the drive command calculated by the steering wheel lock calculating unit and
supplies the electric power to the steering motor,
wherein when a steering wheel torque equal to or greater than a
release threshold value is input during the steering
wheel lock drive control, the steering wheel lock calculating unit stops the steering
wheel lock drive control to release the lock.

12. The steering control device according to claim 1,
wherein when a driving start release trigger is received from the
vehicle during the steering wheel lock drive control, the steering wheel lock calculating unit stops the steering
wheel lock drive control to release the lock.

13. The steering control device according to claim 1,
wherein the steering wheel lock calculating unit gradually
decreases the lock torque output from the steering
motor when the steering wheel lock drive control is
terminated and the lock is released.

14. The steering control device according to claim 1,
wherein the steering wheel lock calculating unit starts the steering
wheel lock drive control when an engine of the vehicle
is stopped or a ready signal is off and an ignition signal
is off.

15. The steering control device according to claim 1 that
is applied to a steer-by-wire system, wherein the steering wheel lock calculating unit continues the
steering wheel lock drive control until the reaction motor becomes capable of outputting reaction torque after a driver gets on the vehicle.

* * * * *